US012798940B2

(12) United States Patent
Yoshinaga et al.

(10) Patent No.: US 12,798,940 B2
(45) Date of Patent: Nov. 17, 2026

(54) TRANSPORT FACILITY

(71) Applicant: Daifuku Co., Ltd., Osaka (JP)

(72) Inventors: Kazuharu Yoshinaga, Hinocho (JP); Yuuji Kinoshita, Hinocho (JP); Kazunari Kimura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 164 days.

(21) Appl. No.: 18/870,183

(22) PCT Filed: Feb. 20, 2023

(86) PCT No.: PCT/JP2023/005933
§ 371 (c)(1),
(2) Date: Nov. 27, 2024

(87) PCT Pub. No.: WO2023/233731
PCT Pub. Date: Dec. 7, 2023

(65) Prior Publication Data

US 2025/0333275 A1 Oct. 30, 2025

(30) Foreign Application Priority Data

May 30, 2022 (JP) ................................ 2022-087758

(51) Int. Cl.
*B66F 9/06* (2006.01)
*B66F 9/12* (2006.01)
(Continued)

(52) U.S. Cl.
CPC ................ *B66F 9/063* (2013.01); *B66F 9/12* (2013.01); *G05D 1/225* (2024.01); *G05D 1/244* (2024.01);
(Continued)

(58) Field of Classification Search
CPC ........... B66F 9/063; B66F 9/12; G05D 1/225; G05D 1/244; G05D 2101/22;
(Continued)

(56) References Cited

U.S. PATENT DOCUMENTS 11,126,944 B1 * 9/2021 Aggarwal ............ G01C 21/206
11,167,923 B2 * 11/2021 Sabhnani ................. B65G 1/10
(Continued)

FOREIGN PATENT DOCUMENTS

JP 2007072572 A * 3/2007
JP 6571916 B2 * 9/2019 ............ B65G 65/00
(Continued)

OTHER PUBLICATIONS

International Search Report re PCT/JP2023/005933, issued Apr. 11, 2023, 6 pages.
(Continued)

*Primary Examiner* — Saul Rodriguez
*Assistant Examiner* — Jaimin G Patel
(74) *Attorney, Agent, or Firm* — The Webb Law Firm

(57) ABSTRACT

A transport vehicle travels with a support surface positioned at a second height if a straight distance (L) from a travel starting point at which the transport vehicle starts traveling while supporting an article to a directional change position (80) at which the transport vehicle is to perform a turning operation that does not involve a change of the orientation of the article is within a predetermined distance (Ls), and the transport vehicle travels with the support surface positioned at a third height if the straight distance (L) is longer than the predetermined distance (Ls).

11 Claims, 11 Drawing Sheets

(51) Int. Cl.
*G05D 1/225* (2024.01)
*G05D 1/244* (2024.01)
*G05D 101/00* (2024.01)
*G05D 105/28* (2024.01)
*G05D 107/70* (2024.01)

(52) U.S. Cl.
CPC ..... *G05D 2101/22* (2024.01); *G05D 2105/28* (2024.01); *G05D 2107/70* (2024.01)

(58) Field of Classification Search
CPC ........... G05D 2105/28; G05D 2107/70; B65G 65/00; B65G 2201/0297; B65G 1/0492; B65G 1/1378
See application file for complete search history.

(56) References Cited

U.S. PATENT DOCUMENTS

2007/0288123 A1* 12/2007 D'Andrea ............... B66F 9/063
700/214
2020/0010280 A1* 1/2020 Abe ........................ B65G 35/06
2021/0155410 A1* 5/2021 Takai ................... B65G 1/1375

FOREIGN PATENT DOCUMENTS

JP 2020090364 A * 6/2020 ........... B65G 1/0471
JP 2020104986 A * 7/2020 ............... B65G 1/10
JP 2021017309 A * 2/2021 ............. G05D 1/243
JP 6930023 B2 * 9/2021 ............. B61B 13/00
JP 2022027226 A * 2/2022
WO WO-2022049743 A1 * 3/2022 ........... G05D 1/0234

OTHER PUBLICATIONS

Written Opinion re PCT/JP2023/005933, issued Apr. 11, 2023, 5 pages.

* cited by examiner

EXAMPLE 1

Fig.6

EXAMPLE 1

| POINT | Pd | Pd→A | A | B | C | C→Pa | Pa |
|---|---|---|---|---|---|---|---|
| SUPPORT SURFACE HEIGHT | H3→H1 | H1→H2 | H2 | H2 | H2 | H2→H1 | H1→H3 |
| SET SPEED | $V < V_s$ | $V < V_s$ | $V < V_s$ | $V < V_s$ | $V < V_s$ | $V < V_s$ | $V < V_s$ |
| OPERATION | | | | RELATIVE TURNING | RELATIVE TURNING | | |

Fig.8

EXAMPLE 2

| POINT | Pd | Pd→A | A | B | C | D | D→Pa | Pa |
|---|---|---|---|---|---|---|---|---|
| SUPPORT SURFACE HEIGHT | H3→H1 | H1→H3 | H3 | H3 | H3 | H3 | H3→H1 | H1→H3 |
| SET SPEED | V<Vs | V<Vs | V=Vs | V<Vs | V=Vs | V=Vs | V<Vs | V<Vs |
| OPERATION | | | | INTEGRAL TURNING | | | | |

Fig.10

EXAMPLE 3

| POINT | Pd | Pd→A | A | B | B→C | C | D | D→E | E | E→Pa | Pa |
|---|---|---|---|---|---|---|---|---|---|---|---|
| SUPPORT SURFACE HEIGHT | H3→H1 | H1→H2 | H2 | H2 | H2→H3 | H3 | H3 | H3→H2 | H2 | H2→H1 | H1→H3 |
| SET SPEED | V<Vs | V<Vs | V<Vs | V<Vs | V=Vs | V=Vs | V=Vs | V=Vs | V<Vs | V<Vs | V<Vs |
| OPERATION | | | | RELATIVE TURNING | | | | | RELATIVE TURNING | | |

TRANSPORT FACILITY

CROSS-REFERENCE TO RELATED APPLICATIONS

This application is the United States national phase of International Patent Application No. PCT/JP2023/005933 filed Feb. 20, 2023, and claims priority to Japanese Patent Application No. 2022-087758 filed May 30, 2022, the disclosures of which are hereby incorporated by reference in their entireties.

BACKGROUND OF THE INVENTION

Field of the Invention

The present invention relates to a transport facility that includes a transfer point having a placement surface on which an article is placeable, and a transport vehicle including a transfer device configured to transfer the article to and from the transfer point and a carriage body configured to travel while supporting the transfer device.

Description of Related Art

JP 6571916B discloses an example of this type of transport facility. In the following, the reference numerals in parentheses in the description of the background section are those used in JP 6571916B.

A transport vehicle (1a) includes a carriage body (11) and a transfer device (12a), as shown in FIGS. 12 to 16 of JP 6571916B. The carriage body (11) can rotate independently of the transfer device (12a) and change its travel direction without changing the orientation of an article (9) that is supported by the transfer device (12a). The transfer device (12a) has a support surface for supporting the article (9) from below. The transfer device (12a) can change the height of the support surface. The transport vehicle (11a) transfers the article (9) between the support surface of the transfer device (12a) and a conveyor (C1) by raising and lowering the transfer device (12a) while being positioned below a transfer point (e.g., the conveyor C1).

JP 6571916B does not specifically disclose the relationship between the traveling state of the transport vehicle and the height of the support surface (the surface of the transfer device for supporting the article). The height of the support surface affects the stability of the article being supported. The stability of the article affects the travel speed of the transport vehicle. Further, the travel speed of the transport vehicle affects the transport time of the article. That is, the relationship between the traveling state of the transport vehicle and the height of the support surface may affect the transport time of the article.

SUMMARY OF THE INVENTION

In view of the foregoing circumstances, it is desirable to realize a transport facility that can easily shorten the transport time of the article.

A transport facility includes:

- a transfer point having a placement surface on which an article is placeable; and
- a transport vehicle including:
  - a transfer device configured to transfer the article to and from the transfer point; and
  - a carriage body configured to travel while supporting the transfer device,

- the transport vehicle is configured to travel along a floor and perform a turning operation to change a travel direction at a directional change position determined in accordance with a destination,
- the transfer device includes:
  - a support having a support surface configured to support the article from below,
  - a lift configured to raise and lower the support, and
  - a turner configured to turn the support relative to the carriage body about a turning axis extending along an up-down direction,
- the lift is capable of changing a height of the support surface to a first height higher than the placement surface, a second height lower than the placement surface, and a third height lower than the second height,
- the transfer device transfers the article to and from the transfer point by raising and lowering the support surface between the first height and the second height or the third height,
- the transport vehicle performs the turning operation with the support surface positioned at the second height in response to changing a direction of the carriage body without changing an orientation in a plan view of the article supported by the support surface by causing the turner to turn the support relative to the carriage body, and
- the transport vehicle travels with the support surface positioned at the second height if a straight distance from a travel starting point at which the transport vehicle starts traveling while supporting the article to the directional change position at which the transport vehicle is to perform the turning operation that does not involve a change of the orientation of the article is within a predetermined distance, and the transport vehicle travels with the support surface positioned at the third height if the straight distance is longer than the predetermined distance.

According to this configuration, the travel speed of the transport vehicle is unlikely to be high if the straight distance is within the predetermined distance. Thus, even if the article supported by the support surface is maintained at a relatively high position by positioning the support surface at the second height, the carriage body can travel without making the orientation of the article unstable. Further, the transport vehicle can reach the directional change position where the transport vehicle is to perform the turning operation while maintaining the height of the support surface at the second height. Thus, the transport vehicle can transition to the turning operation at this directional change position without changing the height of the support surface. Accordingly, the transport time of the article can be shortened. Furthermore, according to this configuration, the center of gravity of the transport vehicle can be lowered by positioning the support surface to the third height if the straight distance is longer than the predetermined distance. The transport vehicle can therefore travel at high speed while stabilizing the orientation of the article. Accordingly, the transport time of the article can also be shortened from this point.

Further features and advantages of the technology according to the present disclosure will become more apparent in the description of the following illustrative and non-limiting embodiments that will be described with reference to the drawings.

BRIEF DESCRIPTION OF THE DRAWINGS

FIG. 6 depicts behavior of a transport vehicle at each point in the case of FIG. 5.

FIG. 8 depicts behavior of the transport vehicle at each point in the case of FIG. 7.

FIG. 10 depicts behavior of the transport vehicle at each point in the case of FIG. 9.

DESCRIPTION OF THE INVENTION

Hereinafter, embodiments of a transport facility will be described with reference to the drawings.

Figure 1:
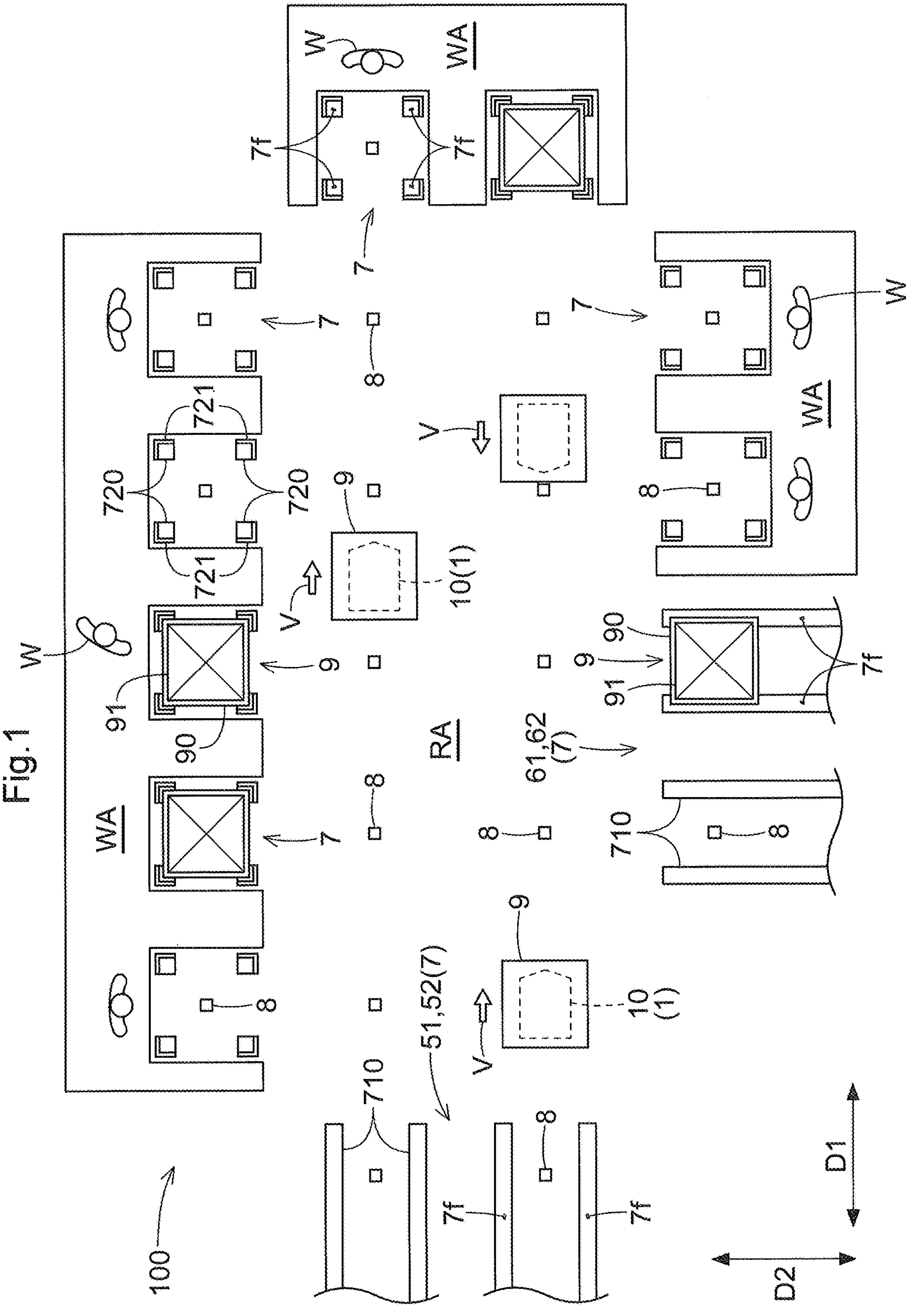
FIG. 1 is a plan view of a transport facility.
Figure 2:
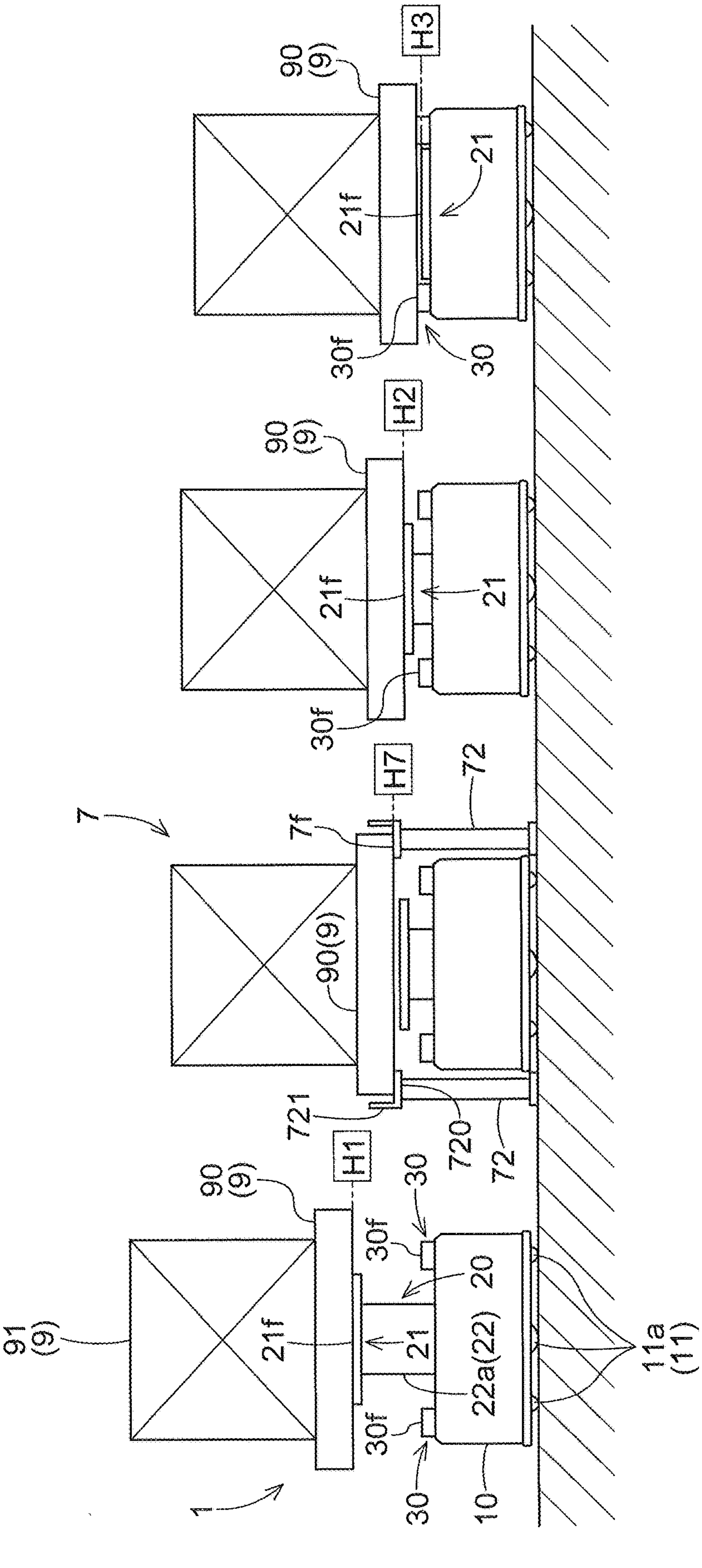
FIG. 2 depicts the height relationship between a placement surface at a transfer point and a support surface of a support.

A transport facility 100 includes transfer points 7 having placement surfaces 7*f* on which articles 9 are to be placed, and transport vehicles 1 each including a transfer device 20 that transfers an article 9 to and from a transfer point 7 and a carriage body 10 that travels while supporting the transfer device 20, as shown in FIGS. 1 and 2. The transport facility 100 of the present embodiment includes a control device C (see FIG. 4). The control device C is configured, for example, to manage a transport schedule for the entire facility and to give the transport vehicles 1 transport commands.

Each article 9 of the present embodiment includes a pallet 90 and one or more loads 91 placed on the pallet 90. Each transport vehicle 1 transports a pallet 90 with one or more loads 91 placed thereon, or an empty pallet 90 without a load 91. Each transfer point 7 is configured such that a pallet 90 can be directly placed therein.

The transport facility 100 of the present embodiment has a travel area RA in which the transport vehicle 1 travels, and a work area WA in which work for articles 9 is performed.

In the present embodiment, a plurality of transfer points 7 are located at positions adjacent to the travel area RA. Thus, the transport vehicle 1 can transport an article 9 to each of the transfer points 7 by traveling in the travel area RA while carrying the article 9.

Further, some of the transfer points 7 of the present embodiment are located at positions adjacent to the work area WA. The articles 9 transported to the transfer points 7 adjacent to the work area WA are processed by workers or robots. In the example shown, workers W are located in the work area WA. For example, the workers W in the work area WA perform the work of picking loads 91. In this picking operation, for example, a worker W performs the work of taking necessary loads 91 out of a plurality of loads 91 placed on a pallet 90. Note that the work performed in the work area WA is not limited to the above, and may be the work of stacking loads 91 on pallets 90 or any other work.

The transport facility 100 of the present embodiment includes a carry-in section 61 in which articles 9 are carried in from outside the facility, a discharge section 62 in which articles 9 are discharged outside the facility, an automated storage (not shown) for storing articles 9, a loading section 51 in which articles 9 are loaded into the automated storage, and an unloading section 52 in which articles 9 are unloaded from the automated storage, as shown in FIG. 1.

The carry-in section 61, the discharge section 62, the loading section 51, and the unloading section 52 of the present embodiment each include a conveyor for transporting articles 9. The conveyor has two transport units 710 spaced apart from each other in a direction (width direction) perpendicular to a transport direction in which articles 9 are transported. Each of the two transport units 710 transports articles 9 along the transport direction while supporting the articles 9 from below. That is, the upper surface of each of the two transport units 710 that constitute the conveyor serves as a placement surface 7*f* on which articles 9 are placed. The conveyor in this example is constituted by a chain conveyor that transports articles 9 using a pair of chains (transport units 710). Each conveyor serves as a target point for the transfer of articles 9 to and from the transfer device 20 of the transport vehicle 1. That is, the conveyors in the carry-in section 61, the discharge section 62, the loading section 51, and the unloading section 52 of the present embodiment each correspond to the transfer point 7. In other words, the carry-in section 61, the discharge section 62, the loading section 51, and the unloading section 52 each correspond to the transfer point 7.

Each transfer point 7 of the present embodiment includes a plurality of columns 72 spaced apart from each other at least in the vehicle width direction of the transport vehicle 1 (see FIG. 2), and article receivers 720 at upper portions of respective columns 72. In this example, the transfer points 7 adjacent to the work area WA, among the plurality of transfer points 7 in the transport facility 100, each have the plurality of columns 72 and the article receivers 720 at the upper portions of the respective columns 72. Note that the carry-in section 61, the discharge section 62, the loading section 51, and the unloading section 52, which serve as the transfer points 7, each include a pair of transport units 710 (chains in this example) capable of supporting articles 9 from below, as mentioned above.

Each of the article receivers 720 has a placement surface 7*f* on which an article 9 is placed. In the present embodiment, each transfer point 7 adjacent to the work area WA has four columns 72 (four article receivers 720), as shown in FIG. 1. Four corners of an article 9 placed at the transfer point 7 are supported from below by the four columns 72 (four article receivers 720).

Each of the article receivers 720 of the present embodiment has a regulator 721 that protrudes upward from the placement surface 7*f* and regulates the position in the horizontal direction of the article 9 placed on the placement surface 7*f*, as shown in FIGS. 1 and 2. The regulators 721 of the article receivers 720 surround the outer edge of the article 9 from the outer side in the horizontal direction, with the article 9 placed on the placement surfaces 7*f* of the article receivers 720. This makes it possible to regulate the position of the article 9 placed at the transfer point 7 such that the article 9 does not move in the horizontal direction.

Figure 4:
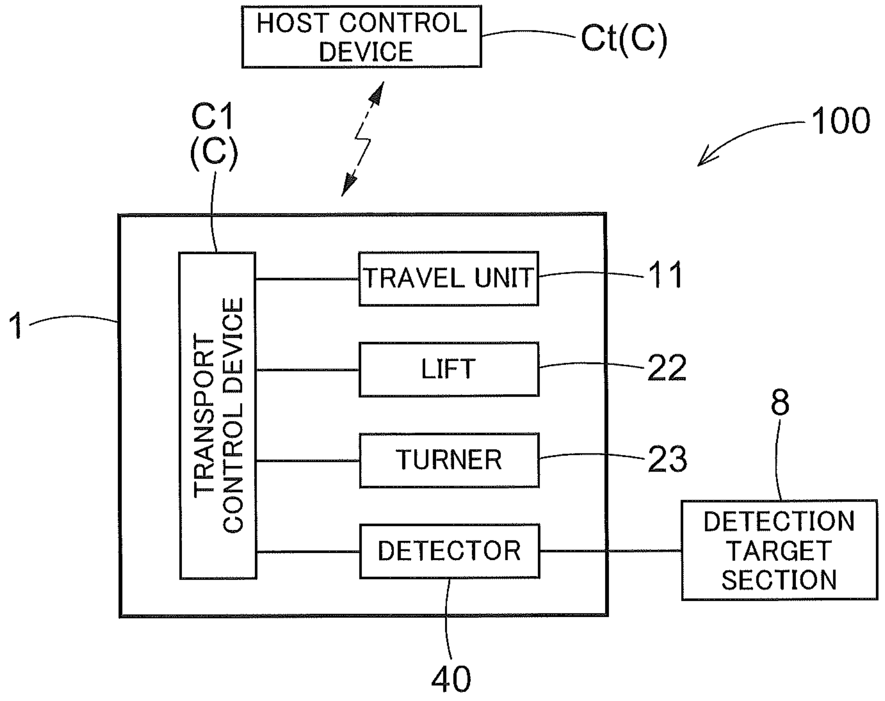
FIG. 4 is a control block diagram.

The transport vehicle 1 of the present embodiment has a detector 40 (see FIG. 4). Also, detection target sections 8 to be detected by the detector 40 are provided at a plurality of locations on the floor. Each detection target section 8 stores or displays information indicating the position at which this detection target section 8 is located. The transport vehicle 1 can ascertain its own current location by detecting a detection target section 8 using the detector 40.

A plurality of detection target sections 8 are spaced apart from each other in a regular arrangement in the travel area RA of the present embodiment. Further, the detection target sections 8 are also provided at the respective transfer points 7. In this example, the detection target sections 8 are provided at points on the floor corresponding to the respective transfer points 7. The transport vehicle 1 travels on the floor while correcting its own current position (estimated current position) based on the results of detecting the detection target sections 8 using the detector 40. Each detection target section 8 in this example is constituted by an identification code such as a one-dimensional or two-dimensional code. The detector 40 of the transport vehicle 1 is constituted by a code reader that reads the identification code. However, there is no limitation to this configuration. For example, each detection target section 8 may be constituted by an IC tag, and the detector 40 may be constituted by an IC tag reader. Alternatively, each detection target section 8 may be constituted by a mark, and the detector 40 may be constituted by an image capture device that captures an image of the mark.

Figure 5:
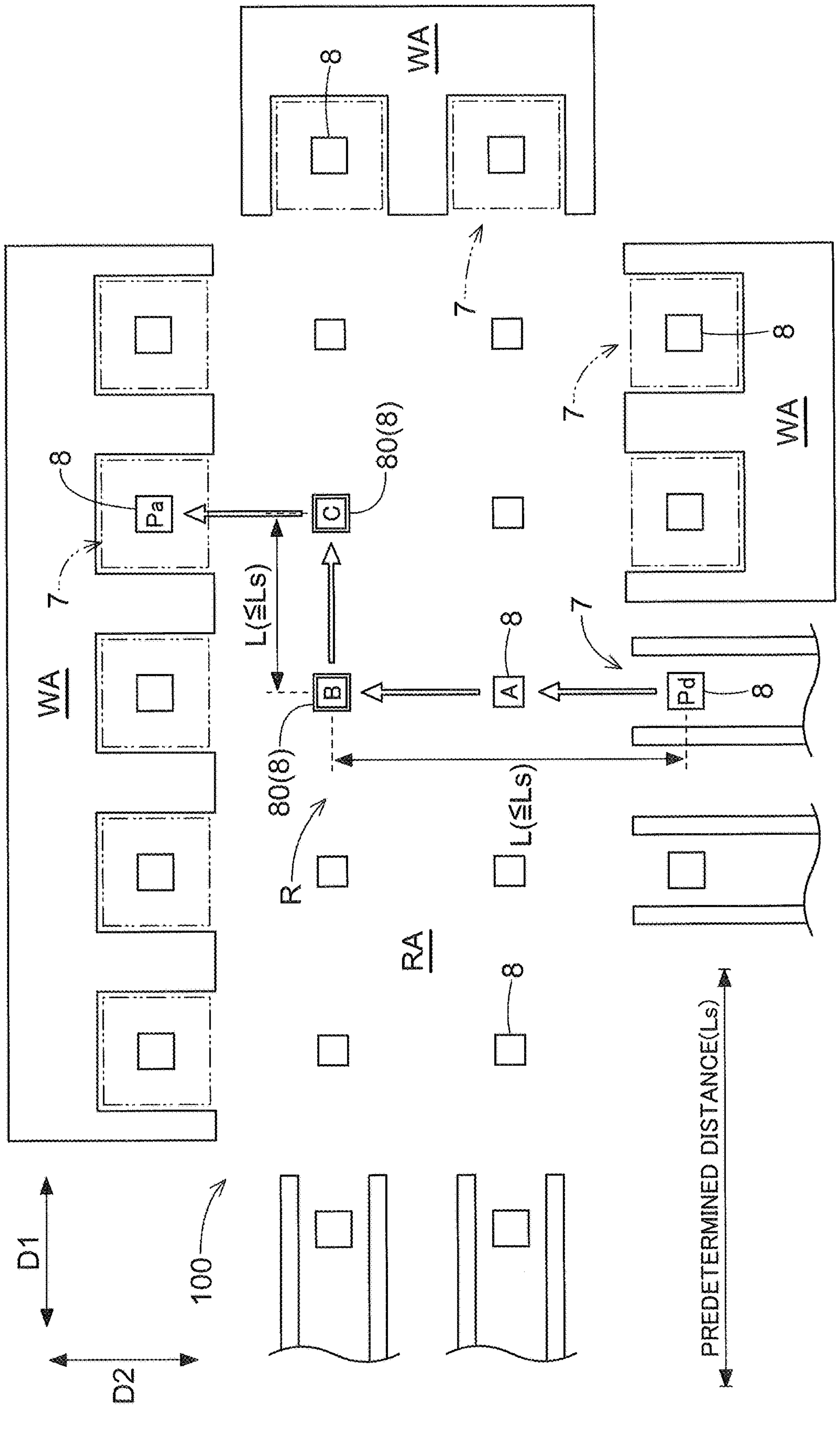
FIG. 5 illustrates a case where the straight distance to a directional change position at which a relative turning operation is to be performed is within a predetermined distance and the orientation of an article is not changed between a transport source and a transport destination.

The control device C (see FIG. 4) of the present embodiment sets a transport route R from a transport source Pd to a transport destination Pa of each article 9, as shown in FIG. 5 and other figures. The transport route R is set so as to connect a plurality of detection target sections 8. The transport source Pd of the present embodiment is defined based on the position of a detection target section 8 located at a transfer point 7 serving as the transport source Pd. The transport destination Pa is defined based on the position of a detection target section 8 located at a transfer point 7 serving as the transport destination Pa. The transport route R is set so as to connect a plurality of detection target sections 8 present between the detection target section 8 corresponding to the transport source Pd and the detection target section 8 corresponding to the transport destination Pa. Assuming that two directions (here, two horizontal directions) perpendicular to each other in a plan view are defined as a first direction D1 and a second direction D2, the transport route R in this example is set so as to connect detection target sections 8 adjacent to each other in the first direction D1 or detection target sections 8 adjacent to each other in the second direction D2. Therefore, the transport route R in this example is a route that combines a straight route along the first direction D1 and a straight route along the second direction D2. The transport vehicle 1 traveling along the transport route R travels straight along the first direction D1 or travels straight along the second direction D2.

The transport vehicle 1 is configured to travel along the floor and perform a turning operation to change the travel direction at a directional change position 80 (see FIG. 5 and other figures), which is determined in accordance with a destination, as shown in FIGS. 1 and 2. Here, the "destination" refers to the transfer point 7 serving as the transport destination Pa, as shown in FIG. 5 and other figures. The directional change position 80 is determined based on the positions of a plurality of detection target sections 8. Specifically, the position of a detection target section 8 located in a region where the transport route R curves (in this example, a region where the transport route R turns at a right angle), out of the plurality of detection target sections 8 constituting the transport route R, is determined as a directional change position 80.

The transport vehicle 1 includes the carriage body 10 and the transfer device 20 supported by the carriage body 10, as mentioned above.

The carriage body 10 includes a travel unit 11. The travel unit 11 of the present embodiment includes a plurality of wheels 11*a*, which are spaced apart from each other at least in the vehicle width direction, and a travel driver (not shown) that drives the wheels 11*a* to rotate. The travel driver is constituted by an electric motor or the like, for example.

The transfer device 20 transfers an article 9 to and from a transfer point 7. While the transport vehicle 1 is at a transfer point 7, the transfer device 20 delivers an article 9 to the transfer point 7 or receives an article 9 from the transfer point 7.

The transfer device 20 includes a support 21 having a support surface 21*f* for supporting an article 9 from below, a lift 22 that raises and lowers the support 21, and a turner 23 (see FIG. 4) that turns the support 21 about a turning axis Ax, which extends along the up-down direction, relative to the carriage body 10, as shown in FIG. 2.

Figure 3:
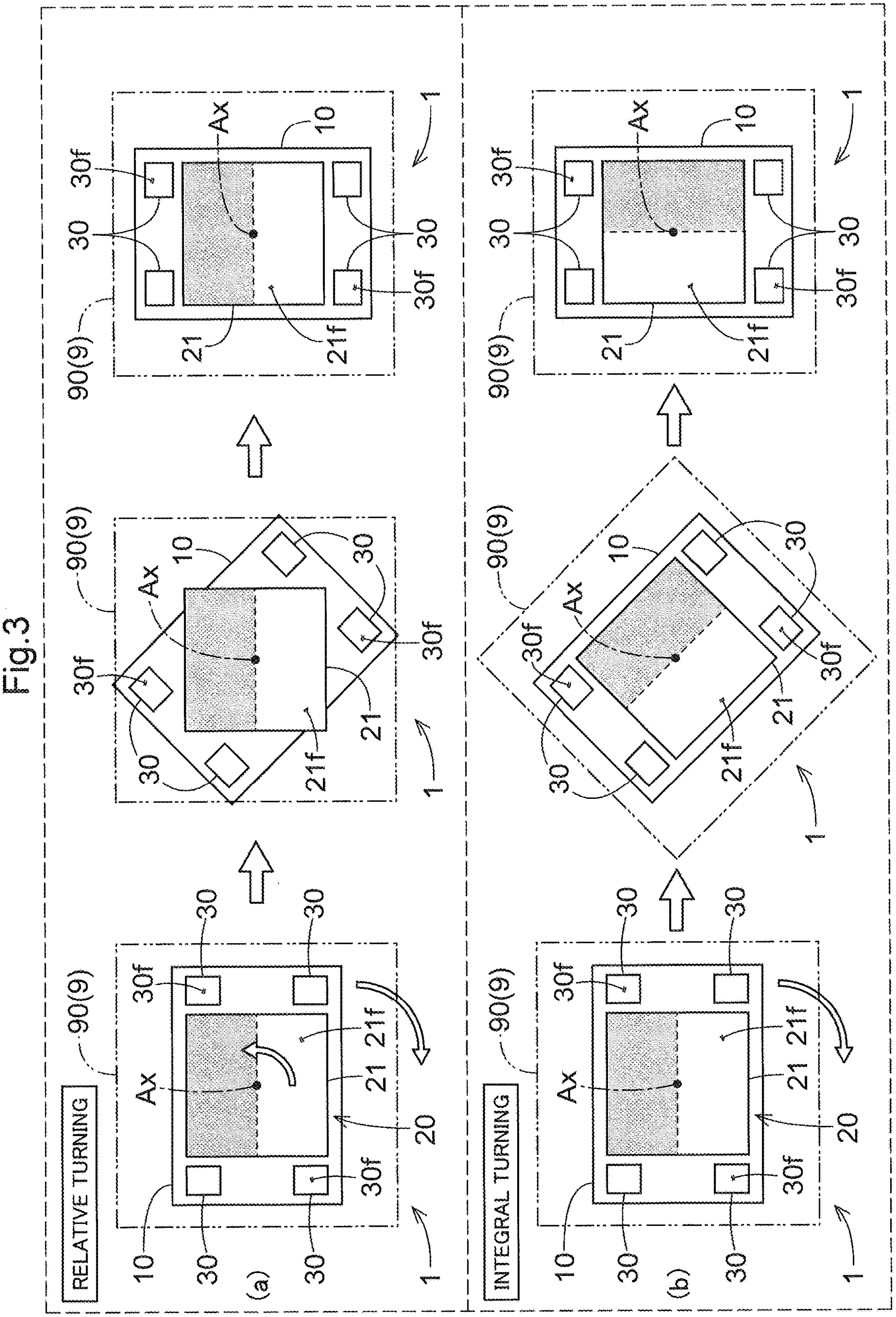
FIG. 3 illustrates turning operations.

The support 21 of the present embodiment is rectangular in a plan view (see FIG. 3). More specifically, the support 21 is square in a plan view. The support 21 has a size that allows the support 21 to pass in the up-down direction between the plurality of placement surfaces 7*f* of a transfer point 7, and is smaller than the spacing between the placement surfaces 7*f* in the transfer point 7 in a plan view.

The turner 23 drives the support 21 to turn about the turning axis Ax that extends along the up-down direction. The turner 23 is constituted by an electric motor or the like, for example.

The lift 22 of the present embodiment includes a shaft member 22*a* and a lift driver (not shown) for moving the shaft member 22*a* back and forth along the up-down direction. In this example, the support 21 is joined to an upper end of the shaft member 22*a*. The support 21 moves upward and downward along the up-down direction due to the shaft member 22*a* being driven by the lift driver to move back and forth along the up-down direction. The lift driver is constituted by an electric motor or the like, for example.

The lift 22 can change the height of the support surface 21*f* to a first height H1, which is higher than the placement surfaces 7*f*, a second height H2, which is lower than the placement surfaces 7*f*, and a third height H3, which is lower than the second height H2. That is, the lift 22 can change the height of the support surface 21*f* between at least three levels.

The height of the placement surfaces 7*f* (hereinafter also referred to simply as a "placement surface height H7") is fixed in the present embodiment. The first height H1 is higher than the placement surface height H7. The second height H2 and the third height H3 are lower than the placement surface height H7. That is, the placement surface height H7 is set between the first height H1 and the second and third heights H2 and H3. The transfer device 20 transfers an article 9 to and from the transfer point 7 by raising and lowering the support surface 21*f* between the first height H1 and the second height H2 or the third height H3. Specifically, the transfer device 20 delivers the article 9 to the placement surfaces 7*f* by changing the height of the support surface 21*f* supporting the article 9 from the first height H1 to the second height H2 or the third height H3. The transfer device 20 receives the article 9 supported on the placement surfaces 7*f* by changing the height of the support surface 21*f* from the second height H2 or the third height H3 to the first height H1.

In the present embodiment, the placement surface height H7 is common to the plurality of transfer points 7 in the transport facility 100. Thus, the transfer device 20 can transfer (deliver or receive) the article 9 in all of the transfer points 7 by raising and lowering the support surface 21*f* between the first height H1 and the second height H2 or the third height H3.

Specifically, an article 9 is transferred to and from a transfer point 7 adjacent to the work area WA, among the plurality of transfer points 7, as follows. That is, the transport vehicle 1 transfers the article 9 to and from the transfer point 7 by raising and lowering the support surface 21*f* between the first height H1 and the second height H2 or the third height H3, with the support 21 positioned between the plurality of article receivers 720 in a plan view. The first height H1 of the present embodiment is set to a position higher than the upper end of the regulator 721. Specifically, the first height H1 is set to a position higher than the upper end of the regulator 721 at least by an amount corresponding to the thickness in the up-down direction of the support 21. When delivering an article 9 to the transfer point 7, the transport vehicle 1 enters between the plurality of article receivers 720 in a plan view with the support surface 21*f*, which is supporting the article 9, positioned at the first height H1. The first height H1 is set to a position higher than the upper end of the regulator 721 of each article receiver 720, as mentioned above. This can prevent the support 21 and the article 9 supported thereby from interfering with the regulator 721 while the transport vehicle 1 enters between the article receivers 720. When receiving an article 9 from the transfer point 7, the transport vehicle 1 that has entered between the plurality of article receivers 720 in a plan view raises the support surface 21*f* from the second height H2 or the third height H3 to the first height H1 to receive the article 9, and thereafter exits from between the article receivers 720 while maintaining the height of the support surface 21*f* at the first height H1. This can prevent the support 21 and the article 9 supported thereby from interfering with the regulator 721 while the transport vehicle 1 exits from between the article receivers 720.

An article 9 is transferred in the carry-in section 61, the discharge section 62, the loading section 51, or the unloading section 52, among the transfer points 7, as follows. That is, the transport vehicle 1 transfers an article 9 to and from the transfer point 7 (the carry-in section 61, the discharge section 62, the loading section 51, or the unloading section 52) by raising and lowering the support surface 21*f* between the first height H1 and the second height H2 or the third height H3 with the support 21 positioned between the two transport units 710 in a plan view. When delivering the article 9 to the transfer point 7, the transport vehicle 1 enters between the two transport units 710 in a plan view with the support surface 21*f*, which is supporting the article 9, positioned at the first height H1. When receiving an article 9 from the transfer point 7, the transport vehicle 1 that has entered between the two transport units 710 in a plan view raises the support surface 21*f* from the second height H2 or the third height H3 to the first height H1 to receive the article 9, and thereafter exits from between the two transport units 710 while maintaining the height of the support surface 21*f* at the first height H1.

The transport vehicle 1 of the present embodiment includes auxiliary supports 30 that assist the support 21 in supporting an article 9. Each auxiliary support 30 has an auxiliary support surface 30*f* whose height is fixed. The auxiliary supports 30 are fixed to the upper surface of the carriage body 10, and their positions relative to the carriage body 10 are fixed.

The auxiliary supports 30 of the present embodiment are separated from each other with the support 21 therebetween in a plan view, as shown in FIG. 3. In this example, a plurality of (four in the example shown) auxiliary supports 30 are separated from each other around the support 21 in a plan view.

The first height H1 and the second height H2 are higher than the height of the auxiliary support surfaces 30*f*, as shown in FIG. 2. Meanwhile, the third height H3 is the same as or lower than the height of the auxiliary support surfaces 30*f*. The third height H3 of the present embodiment is lower than the height of the auxiliary support surfaces 30*f*. With this, the support surface 21*f* supporting the article 9 is positioned to the third height H3 from the first height H1 or the second height H2, thereby canceling the support of the article 9 by the support surface 21*f*, and the article 9 is then supported by the auxiliary support surfaces 30*f* of the auxiliary supports 30.

Here, the appropriate orientation (appropriate orientation in a plan view) of the article 9 is different for each of the plurality of transfer points 7. For example, the transfer points 7 adjacent to the work area WA require the orientation of the article 9 to be suitable for performing the work for this article 9. The other transfer points 7, namely the carry-in section 61, the discharge section 62, the loading section 51, and the unloading section 52, require the orientation of the article 9 to be suitable for transporting this article 9.

In a case where the orientation of the article 9 in a plan view needs to be changed between the transfer point 7 of the transport source Pd and the transfer point 7 of the transport destination Pa (e.g., the case shown in FIG. 7), the transport vehicle 1 changes the orientation of the article 9 to an appropriate orientation corresponding to the transfer point 7 of the transport destination Pa while transporting the article 9 between the transfer point 7 of the transport source Pd and the transfer point 7 of the transport destination Pa.

The transport vehicle 1 performs a turning operation on the spot to change the travel direction (see FIG. 3), as mentioned above. In the transport facility 100 according to the present disclosure, the orientation of the article 9 in a plan view is changed using the turning operation of the transport vehicle 1. In other cases, in the transport facility 100, the turning operation of the transport vehicle 1 is prevented from changing the orientation of the article 9 in a plan view. The following is the detailed description.

The transport vehicle 1 performs at least two types of turning operations, namely a relative turning operation, which does not involve a change of the orientation of the article 9 in a plan view, and an integral turning operation, which involves a change of the orientation of the article 9 in a plan view. FIG. 3(*a*) shows the transport vehicle 1 performing the relative turning operation. FIG. 3(*b*) shows the transport vehicle 1 performing the integral turning operation. In the relative turning operation, the support 21 is turned by the turner 23 in the opposite direction to the direction in which the carriage body 10 turns, independently of the turning of the carriage body 10 (see FIG. 3(*a*)). In the integral turning operation, the support 21 is not turned by the turner 23, but is turned by the turning of the carriage body 10, in the same direction as the turning direction of the carriage body 10 (see FIG. 3(*b*)). In FIG. 3, half of the support 21 is hatched in order to facilitate the understanding of the orientation of the support 21.

The transport vehicle 1 performs a turning operation (relative turning operation) with the support surface 21*f* positioned at the second height H2 in the case of changing the direction of the carriage body 10 without changing the orientation in a plan view of the article 9 supported by the support surface 21*f* by causing the turner 23 to turn the support 21 relative to the carriage body 10, as shown in FIGS. 2 and 3. The article 9 is supported by the support 21 or the auxiliary support 30 (the carriage body 10) while the transport vehicle 1 supports the article 9. The article 9 is supported only by the support 21 while the support surface 21*f* is positioned at the second height H2, as mentioned above. In this case, the carriage body 10 (the auxiliary support 30) does not serve to support the article 9. Therefore, positioning the support surface 21*f* at the second height H2 can prevent the directional change (turning) of the carriage body 10 from affecting the orientation of the article 9. The relative turning operation, which does not involve a change of the orientation of the article 9 in a plan view, can thus be performed appropriately.

In the case of performing the relative turning operation that does not involve a change of the orientation of the article 9 in the plan view, the transport vehicle 1 of the present embodiment turns the support 21 in the opposite direction to the turning direction of the carriage body 10 at the same turning angle as the turning angle of the carriage body 10. The support 21 of the present embodiment has a regular N-sided polygonal shape (N is an integer greater than or equal to three) in a plan view, and the turner 23 turns the support 21 in 360/N degree increments relative to the carriage body 10. This allows the relationship in a plan view between the outer shape of the support 21 and the carriage body 10 to be the same even when the transport vehicle 1 performs a turning operation without the support 21 changing its orientation in a plan view. The support 21 in this example has a square shape (N=4) in a plan view. Accordingly, the turner 23 turns the support 21 in 360/4 degree (90 degree) increments relative to the carriage body 10. That is, the transport vehicle 1 in the example shown in FIG. 3(*a*) turns the carriage body 10 by 90 degrees clockwise and the support 21 by 90 degrees counterclockwise, in a plan view. The relative turning operation changes the orientation of the carriage body 10 but does not change the orientation of the support 21, as shown in the figure.

In the case of changing the direction of the carriage body 10 while also changing the orientation in a plan view of the article 9 supported by the support surface 21*f* by integrally turning the support 21 with the carriage body 10, the transport vehicle 1 performs a turning operation (integral turning operation) with the support surface 21*f* positioned at the third height H3, as shown in FIGS. 2 and 3. That is, the transport vehicle 1 performs a turning operation (integral turning operation) with the support surface 21*f* positioned at the third height H3 in the case of changing the orientation in a plan view of the article 9 supported by the support surface 21*f* in conjunction with the turning operation. The article 9 is supported by the support 21 or the auxiliary support 30 (carriage body 10) while the transport vehicle 1 supports the article 9, as mentioned above. The article 9 is supported only by the support 21 while the support surface 21*f* is positioned at the second height H2. Meanwhile, upon this support surface 21*f* being positioned at the third height H3, the article 9, which has been supported by the support surface 21*f*, is then supported by the auxiliary support surface 30*f*, which is positioned at a position higher than the third height H3. In this case, the support 21 does not serve to support the article 9. Therefore, positioning the support surface 21*f* at the third height H3 makes the orientation of the article 9 dependent on the directional change (turning) of the carriage body 10. The integral turning operation involving a change of the orientation of the article 9 in a plan view can thus be performed appropriately.

In the example shown in FIG. 3(*b*), the transport vehicle 1 turns the carriage body 10 clockwise by 90 degrees in a plan view. This turns the support 21, which is not driven by the turner 23, clockwise by 90 degrees together with the carriage body 10. The integral turning operation changes the orientation of the carriage body 10 and the orientation of the support 21 as shown in the figure.

The carriage body 10 of the present embodiment can travel at a predetermined reference speed Vs (see FIG. 8), as shown in FIG. 1. The reference speed Vs in this example is the highest speed of the carriage body 10. The reference speed Vs (the highest speed in this example) is determined as appropriate based on, for example, the management of the facility. The control device C (see FIG. 4) in this example can set the travel speed V of the carriage body 10 to the reference speed Vs. The letter "V" in FIG. 1 indicates the actual travel speed V of the carriage body 10. If the control device C sets the travel speed V of the carriage body 10 to the reference speed Vs, for example, the control device C performs feedback control on the travel speed V of the carriage body 10 with the reference speed Vs as a target value.

The control device C of the present embodiment includes a host control device Ct that manages the entire facility, and a transport control device C1 that is installed in each transport vehicle 1 and controls functional units of the transport vehicle 1, as shown in FIG. 4. The host control device Ct and the transport control device C1 communicate with each other. The host control device Ct designates the transport source Pd and the transport destination Pa of each article 9, and outputs a transport command designating the transport route R from the transport source Pd to the transport destination Pa to a corresponding transport control device C1 (the transport vehicle 1). The transport control device C1 that has received the transport command controls each functional unit of the transport vehicle 1 in which it is installed, in accordance with the transport command. The host control device Ct and the transport control device C1 each have a processor such as a microcomputer, and a peripheral circuit such as a memory, for example. Each function or processing is realized by cooperation of these pieces of hardware and programs executed on the processors such as a computer. In the following, the host control device Ct and the transport control device C1 may be collectively referred to simply as the "control device C".

Example 1

Next, a description is given of an example in which the transport vehicle 1 transports an article 9 from a transport source Pd to a transport destination Pa, with reference to FIGS. 5 and 6. In FIGS. 5 and 6, the transport vehicle 1, the article 9, and other elements are omitted for convenience of illustration.

FIG. 5 shows a transport route R of the transport vehicle 1 in the case where the orientation of the article 9 at the transfer point 7 serving as the transport source Pd is the same as the orientation of the article 9 at the transfer point 7 serving as the transport destination Pa. FIG. 6 shows the height of the support surface 21*f*, the set speed of the carriage body 10, and the operation of the transport vehicle 1 at each point along the transport route R in this case.

In the example shown in FIG. 5, the transport route R is set so as to connect the detection target section 8 at the transport source Pd, the detection target section 8 at a point A, the detection target section 8 at a point B, the detection target section 8 at a point C, and the detection target section 8 at the transport destination Pa. The transport vehicle 1 travels through the transport route R in the order from the transport source Pd to the point A, the point B, the point C, and the transport destination Pa.

In this case, the transport vehicle 1 receives the article 9 from the transfer point 7 of the transport source Pd by changing the height of the support surface 21*f* from the third height H3 to the first height H1 at the transport source Pd, as shown in FIG. 6. The travel speed V of the carriage body 10 at the transport source Pd is set lower than the reference speed Vs (V<Vs). In this example, the travel speed V of the transport vehicle 1 when receiving the article 9 from the transfer point 7 of the transport source Pd is set to zero. That is, the carriage body 10 is stopped.

After receiving the article 9, the transport vehicle 1 starts traveling to the next point (the position of the detection target section 8) while supporting the article 9. In the example shown in FIG. 5, the transport vehicle 1 starts traveling from the transport source Pd to the point A.

Here, the transport vehicle 1 travels with the support surface 21*f* positioned at the second height H2 if the straight distance L from the travel starting point (here, the transport source Pd) at which the transport vehicle 1 started traveling while supporting the article 9 to the directional change position 80 (here, the point B) at which the transport vehicle 1 is to perform a turning operation (relative turning operation) that does not involve a change of the orientation of the article 9 is within a predetermined distance Ls. If the straight distance L is within the predetermined distance Ls as in this case, and if the support surface 21*f* is not positioned at the second height H2 at the travel starting point, the height of the support surface 21*f* may be changed to the second height H2 before the transport vehicle 1 starts traveling, or while the transport vehicle 1 travels after starting traveling. In the latter case, the transport vehicle 1 completes changing the height of the support surface 21*f* to the second height H2 before reaching the directional change position 80. The control device C of the present embodiment sets the transport route R from the transport source Pd to the transport destination Pa of the article 9, and determines whether the straight distance L is within the predetermined distance Ls based on the transport route R. The transport route R in this example is a route that combines a straight route along the first direction D1 and a straight route along the second direction D2, as mentioned above. The control device C calculates the straight distance L based on these straight routes that constitute the transport route R, and determines whether the straight distance L is within the predetermined distance Ls. The predetermined distance Ls is determined as appropriate, based on, for example, the management of the facility.

In the example shown in FIG. 5, the directional change position 80 that the transport vehicle 1 first reaches is the point B. The straight distance L from the transport source Pd, which is the travel starting point, to the point B is within the predetermined distance Ls (L≤Ls). Accordingly, the transport vehicle 1 travels from the transport source Pd to the point B while positioning the support surface 21*f* at the second height H2. Thus, while the support surface 21*f* needs to be positioned at the second height H2 in the case of performing the relative turning operation, the transport vehicle 1 can position the support surface 21*f* at the second height H2 before reaching the directional change position 80 (the point B) where the transport vehicle 1 is to perform the relative turning operation. The transport vehicle 1 can therefore transition to the relative turning operation at the directional change position 80 (here, the point B) without changing the height of the support surface 21*f*. Consequently, the transport time of the article 9 can be shortened.

The transport vehicle 1 in the example shown in FIGS. 5 and 6 changes the height of the support surface 21*f* from the first height H1 to the second height H2 while traveling from the transport source Pd to the point A. The travel speed V of the carriage body 10 at this time is set lower than the reference speed Vs (V<Vs).

At the point A, the transport vehicle 1 maintains the height of the support surface 21*f* at the second height H2. The travel speed V of the carriage body 10 at this time is set lower than the reference speed Vs (V<Vs). In this state, the transport vehicle 1 travels from the point A to the point B.

At the point B, the transport vehicle 1 maintains the height of the support surface 21*f* at the second height H2. The travel speed V of the carriage body 10 at this time is set lower than the reference speed Vs (V<Vs). The travel speed V at the point B is set to zero in this example. The transport vehicle 1, while stopped, performs the relative turning operation at the point B, which is the directional change position 80. The transport vehicle 1 thus directs the travel direction of the carriage body 10 to the next point C without changing the orientation of the article 9 in a plan view. Thereafter, the transport vehicle 1 starts traveling from the point B to the point C.

In the example shown in FIGS. 5 and 6, the straight distance L from the travel starting point (here, the point B) of the transport vehicle 1 to the directional change position 80 (here, the point C) at which the transport vehicle 1 is to perform a turning operation (relative turning operation) that does not involve a change of the orientation of the article 9 is within the predetermined distance Ls (L≤Ls). Accordingly, the transport vehicle 1 travels from the point B to the point C while positioning the support surface 21*f* at the second height H2. Thus, the travel starting point of the transport vehicle 1 is not limited to the starting point of the transport route R (the transport source Pd). If the transport vehicle 1 performs a turning operation, the straight distance L is determined with the point at which this turning operation was performed (in this example, the point B) as a travel starting point.

At the point C, the transport vehicle 1 maintains the height of the support surface 21*f* at the second height H2. The travel speed V of the carriage body 10 at this time is set lower than the reference speed Vs (V<Vs). The travel speed V at the point C is set to zero in this example. The transport vehicle 1, while stopped, performs the relative turning operation at the point C, which is the directional change position 80. The transport vehicle 1 thus directs the travel direction of the carriage body 10 to the transport destination Pa without changing the orientation of the article 9 in a plan view. Thereafter, the transport vehicle 1 starts traveling from the point C to the transport destination Pa.

The transport vehicle 1 changes the height of the support surface 21*f* from the second height H2 to the first height H1 while traveling from the point C to the transport destination Pa. The travel speed V of the carriage body 10 at this time is set lower than the reference speed Vs (V<Vs).

At the transport destination Pa, the transport vehicle 1 delivers the article 9 to the transfer point 7 of the transport destination Pa by changing the height of the support surface 21*f* from the first height H1 to the third height H3. The travel speed V of the carriage body 10 at the transport destination Pa is set lower than the reference speed Vs (V<Vs). In this example, the travel speed V of the transport vehicle 1 while delivering the article 9 to the transfer point 7 of the transport destination Pa is set to zero. That is, the carriage body 10 is stopped.

Example 2

Figure 7:
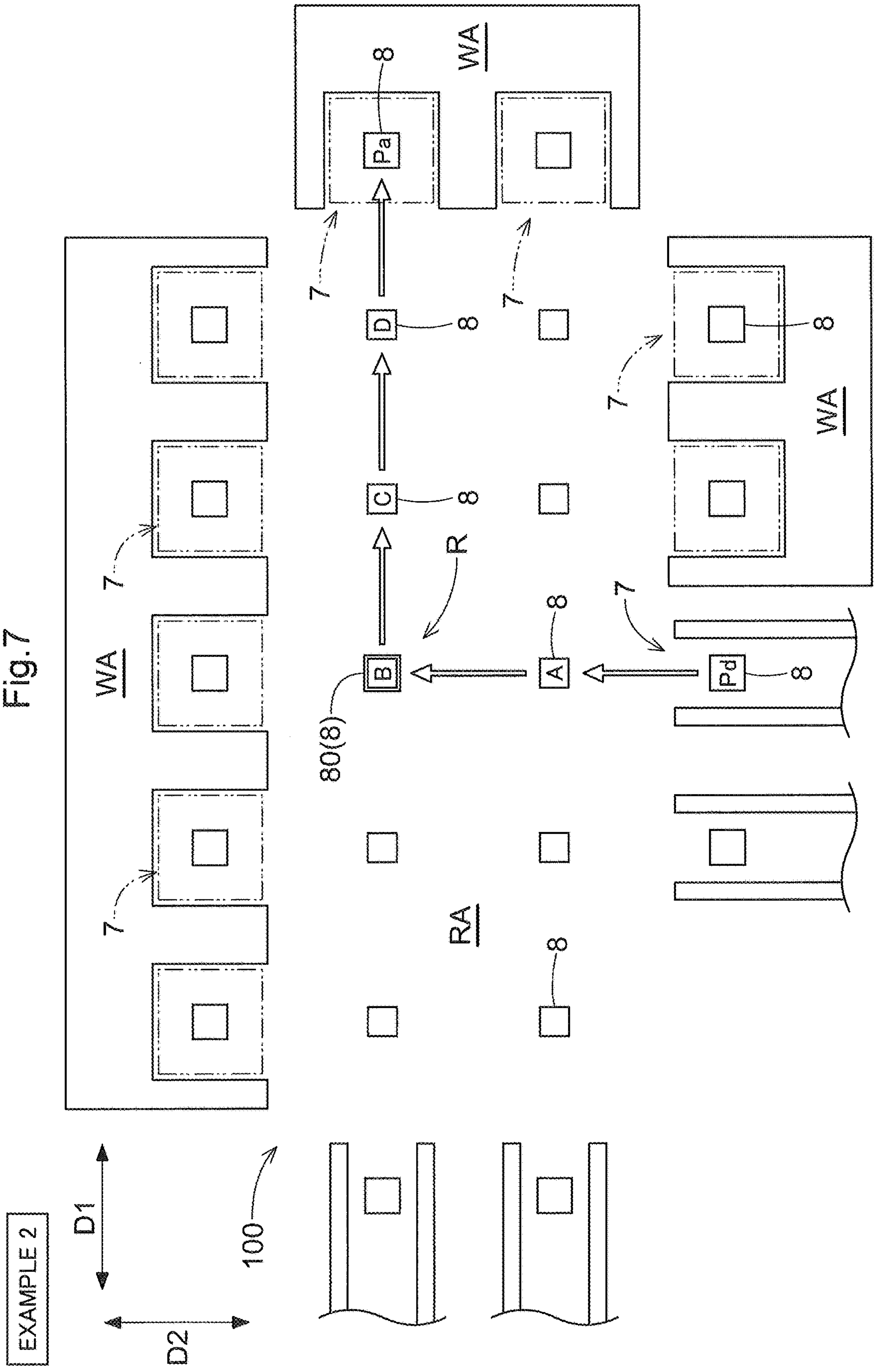
FIG. 7 illustrates a case of changing the orientation of an article between a transport source and a transport destination by means of an integral turning operation.

Next, a description is given of an example in which the transport vehicle 1 transports an article 9 from a transport source Pd to a transport destination Pa, with reference to FIGS. 7 and 8. In FIGS. 7 and 8, the transport vehicle 1, the article 9, and other elements are omitted for convenience of illustration.

FIG. 7 shows a transport route R of the transport vehicle 1 in the case where the orientation of the article 9 at the transfer point 7 serving as the transport source Pd is different from the orientation of the article 9 at the transfer point 7 serving as the transport destination Pa. FIG. 8 shows the height of the support surface 21*f*, the set speed of the carriage body 10, and the operation of the transport vehicle 1 at each point along the transport route R in this case.

In the example shown in FIG. 7, the transport route R is set so as to connect the detection target section 8 at the transport source Pd, the detection target section 8 at a point A, the detection target section 8 at a point B, the detection target section 8 at a point C, the detection target section 8 at a point D, and the detection target section 8 at the transport destination Pa. The transport vehicle 1 travels through the transport route R in the order from the transport source Pd to the point A, the point B, the point C, the point D, and the transport destination Pa.

In this case, the transport vehicle 1 receives the article 9 from the transfer point 7 of the transport source Pd by changing the height of the support surface 21*f* from the third height H3 to the first height H1 at the transport source Pd, as shown in FIG. 8. The travel speed V of the carriage body 10 at the transport source Pd is set lower than the reference speed Vs (V<Vs). In this example, the travel speed V of the transport vehicle 1 when receiving the article 9 from the transfer point 7 of the transport source Pd is set to zero. That is, the carriage body 10 is stopped.

After receiving the article 9, the transport vehicle 1 starts traveling to the next point (the position of the detection target section 8) while supporting the article 9. In the example shown in FIG. 7, the transport vehicle 1 starts traveling from the transport source Pd to the point A.

Here, the transport vehicle 1 travels with the support surface 21*f* positioned at the third height H3 regardless of whether the straight distance from the travel starting point (here, the transport source Pd) at which the transport vehicle 1 started traveling while supporting the article 9 to the directional change position 80 (here, the point B) at which the transport vehicle 1 is to perform a turning operation (integral turning operation) that involves a change of the orientation of the article 9 is within the predetermined distance. In the example shown in FIG. 7, the directional change position 80 that the transport vehicle 1 first reaches is the point B, and the transport vehicle 1 is scheduled to perform at the point B the integral turning operation that involves a change of the orientation of the article 9. Accordingly, the transport vehicle 1 travels from the transport source Pd to the point B while positioning the support surface 21*f* at the third height H3. Thus, while the support surface 21*f* needs to be positioned at the third height H3 in the case of performing the integral turning operation, the transport vehicle 1 can position the support surface 21*f* at the third height H3 before reaching the directional change position 80 (the point B) at which the transport vehicle 1 is to perform the integral turning operation. The transport vehicle 1 can therefore transition to the integral turning operation at the directional change position 80 (here, the point B) without changing the height of the support surface 21*f*. Furthermore, the center of gravity of the transport vehicle 1 can be lowered by positioning the support surface 21*f* at the third height H3, thus allowing the transport vehicle 1 to travel at high speed while stabilizing the orientation of the article 9. Accordingly, the transport time of the article 9 can be shortened.

The transport vehicle 1 in the example shown in FIGS. 7 and 8 changes the height of the support surface 21*f* from the first height H1 to the third height H3 while traveling from the transport source Pd to the point A. The travel speed V of the carriage body 10 at this time is set lower than the reference speed Vs (V<Vs). Here, while the support surface 21*f* is positioned at the first height H1, the position of the article 9 supported by the support surface 21*f* is higher than while the support surface 21*f* is positioned at the second height H2 or the third height H3, making the orientation of the article 9 less stable accordingly. The carriage body 10 of the present embodiment travels at a speed lower than the reference speed Vs or stops in response to the lift 22 raising or lowering the support surface 21*f* between the first height H1 and the second height H2 or the third height H3. This makes it possible to change the height of the support surface 21*f* with high reliability in cases including a state where the height of the support surface 21*f* is set to the first height H1.

At the point A, the transport vehicle 1 maintains the height of the support surface 21*f* at the third height H3. While the support surface 21*f* is positioned at the third height H3, the transport vehicle 1 can stably support the article 9 and can therefore travel at high speed, as mentioned above. Accordingly, the travel speed V of the carriage body 10 at this time is set to the reference speed Vs (V=Vs). In this state, the transport vehicle 1 travels from the point A to the point B.

At the point B, the transport vehicle 1 maintains the height of the support surface 21*f* at the third height H3. The travel speed V of the carriage body 10 at this time is set lower than the reference speed Vs (V<Vs). The travel speed V at the point B is set to zero in this example. The transport vehicle 1, while stopped, performs the integral turning operation at the point B, which is the directional change position 80. The transport vehicle 1 thus directs the travel direction of the carriage body 10 to the point C and changes the orientation of the article 9 to the proper orientation at the transport destination Pa. Thereafter, the transport vehicle 1 starts traveling from the point B to the point C.

At the point C, the transport vehicle 1 maintains the height of the support surface 21*f* at the third height H3. The travel speed V of the carriage body 10 at this time is set to the reference speed Vs (V=Vs). In this state, the transport vehicle 1 travels from the point C to the point D.

At the point D, the transport vehicle 1 maintains the height of the support surface 21*f* at the third height H3. The travel speed V of the carriage body 10 at this time is set to the reference speed Vs (V=Vs). In this state, the transport vehicle 1 travels from the point D to the transport destination Pa.

The transport vehicle 1 changes the height of the support surface 21*f* from the third height H3 to the first height H1 while traveling from the point D to the transport destination Pa. The travel speed V of the carriage body 10 at this time is set lower than the reference speed Vs (V<Vs).

At the transport destination Pa, the transport vehicle 1 delivers the article 9 to the transfer point 7 of the transport destination Pa by changing the height of the support surface 21*f* from the first height H1 to the third height H3. The travel speed V of the carriage body 10 at the transport destination Pa is set lower than the reference speed Vs (V<Vs). In this example, the travel speed V of the transport vehicle 1 while delivering the article 9 to the transfer point 7 of the transport destination Pa is set to zero. That is, the carriage body 10 is stopped.

Example 3

Figure 9:
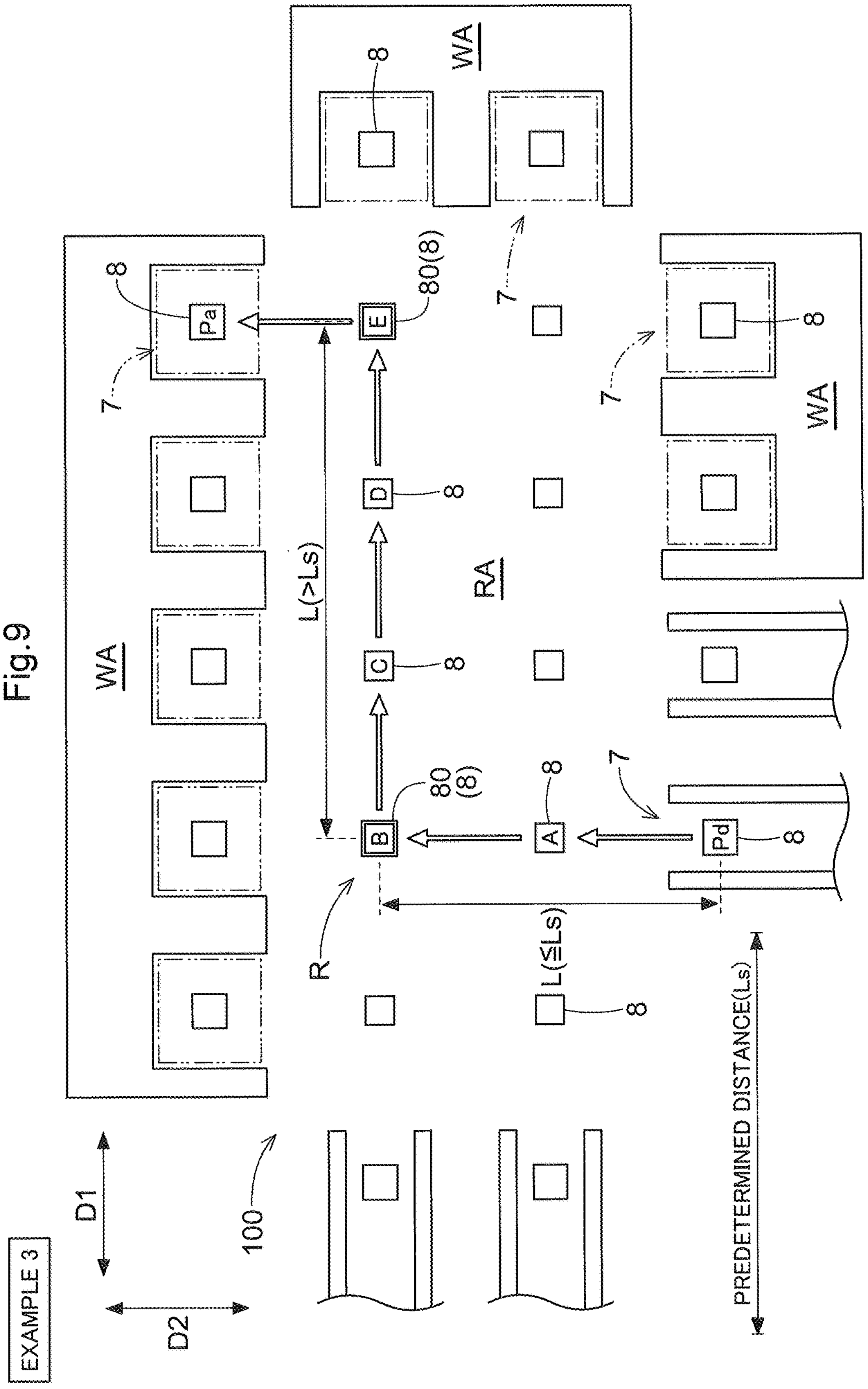
FIG. 9 illustrates a case where the straight distance to a directional change position at which a relative turning operation is to be performed is greater than a predetermined distance and the orientation of an article is not changed between a transport source and a transport destination.

Next, a description is given of an example in which the transport vehicle 1 transports the article 9 from the transport source Pd to the transport destination Pa, with reference to FIGS. 9 and 10. In FIGS. 9 and 10, the transport vehicle 1, the article 9, and other elements are omitted for convenience of illustration.

FIG. 9 shows a transport route R of the transport vehicle 1 in the case where the orientation of the article 9 at the transfer point 7 serving as the transport source Pd is the same as the orientation of the article 9 at the transfer point 7 serving as the transport destination Pa. FIG. 10 shows the height of the support surface 21*f*, the set speed of the carriage body 10, and the operation of the transport vehicle 1 at each point along the transport route R in this case.

In the example shown in FIG. 9, the transport route R is set so as to connect the detection target section 8 at the transport source Pd, the detection target section 8 at a point A, the detection target section 8 at a point B, the detection target section 8 at a point C, the detection target section 8 at a point D, the detection target section 8 at a point E, and the detection target section 8 at the transport destination Pa. The transport vehicle 1 travels through the transport route R in the order from the transport source Pd to the point A, the point B, the point C, the point D, the point E, and the transport destination Pa.

In this case, the transport vehicle 1 receives the article 9 from the transfer point 7 of the transport source Pd by changing the height of the support surface 21*f* from the third height H3 to the first height H1 at the transport source Pd, as shown in FIG. 10. The travel speed V of the carriage body 10 at the transport source Pd is set lower than the reference speed Vs (V<Vs). In this example, the travel speed V of the transport vehicle 1 when receiving the article 9 from the transfer point 7 of the transport source Pd is set to zero. That is, the carriage body 10 is stopped.

After receiving the article 9, the transport vehicle 1 starts traveling to the next point (the position of the detection target section 8) while supporting the article 9. In the example shown in FIG. 9, the transport vehicle 1 starts traveling from the transport source Pd to the point A.

In the example shown in FIG. 9, the directional change position 80 that the transport vehicle 1 first reaches is the point B. The straight distance L from the transport source Pd, which is the travel starting point, to the point B is within the predetermined distance Ls (L≤Ls). Accordingly, the transport vehicle 1 travels from the transport source Pd to the point B while positioning the support surface 21*f* at the second height H2.

The transport vehicle 1 in the example shown in FIGS. 9 and 10 changes the height of the support surface 21*f* from the first height H1 to the second height H2 while traveling from the transport source Pd to the point A. The travel speed V of the carriage body 10 at this time is set lower than the reference speed Vs (V<Vs).

At the point A, the transport vehicle 1 maintains the height of the support surface 21*f* at the second height H2. The travel speed V of the carriage body 10 at this time is set lower than the reference speed Vs (V<Vs). In this state, the transport vehicle 1 travels from the point A to the point B.

At the point B, the transport vehicle 1 maintains the height of the support surface 21*f* at the second height H2. The travel speed V of the carriage body 10 at this time is set lower than the reference speed Vs (V<Vs). The travel speed V at the point B is set to zero in this example. The transport vehicle 1, while stopped, performs the relative turning operation at the point B, which is the directional change position 80. The transport vehicle 1 thus directs the travel direction of the carriage body 10 to the next point C without changing the orientation of the article 9 in a plan view. Thereafter, the transport vehicle 1 starts traveling from the point B to the point C.

Here, the transport vehicle 1 travels with the support surface 21*f* positioned at the third height H3 if the straight distance L from the travel starting point (here, the point B) at which the transport vehicle 1 started traveling while supporting the article 9 to the directional change position 80 (here, the point E) at which the transport vehicle 1 is to perform a turning operation (relative turning operation) that does not involve a change of the orientation of the article 9 is longer than the predetermined distance Ls. If the straight distance L is longer than the predetermined distance Ls as in this case, and if the support surface 21*f* is not positioned at the third height H3 at the travel starting point, the height of the support surface 21*f* may be changed to the third height H3 before the transport vehicle 1 starts traveling or while the transport vehicle 1 travels after starting traveling. In the latter case, the transport vehicle 1 completes changing the height of the support surface 21*f* to the third height H3 before reaching the directional change position 80. If the straight distance L is longer than the predetermined distance Ls, the transport vehicle 1 can contribute more to shortening the transport time of the article 9 by traveling at high speed with the height of the support surface 21*f* set to the third height H3, which is lower than the second height H2, even if the support surface 21*f* needs to be positioned at the second height H2 later (i.e., the support surface 21*f* needs to be positioned at the second height H2 in the case of performing the relative turning operation). The center of gravity of the transport vehicle 1 can be lowered by positioning the support surface 21*f* at the third height H3, allowing the transport vehicle 1 to travel at high speed while stabilizing the orientation of the article 9, as mentioned above. The transport vehicle 1 of the present embodiment travels at the reference speed Vs if the straight distance L is longer than the predetermined distance Ls.

In the example shown in FIG. 9, the straight distance L from the point B, which is the travel starting point, to the point E, which is the next directional change position 80, is longer than the predetermined distance Ls (L>Ls). Accordingly, the transport vehicle 1 travels from the point B to the point E at the reference speed Vs while positioning the support surface 21*f* at the third height H3.

The transport vehicle 1 changes the height of the support surface 21*f* from the second height H2 to the third height H3 while traveling from the point B to the point C. That is, the lift 22 of the present embodiment raises and lowers the support surface 21*f* between the second height H2 and the third height H3 while the carriage body 10 travels. Changing the height of the support surface 21*f* between the second height H2 and the third height H3 does not include a state where the height of the support surface 21*f* is the first height H1, thereby allowing the orientation of the article 9 to be stabilized relatively easily. Raising and lowering the support surface 21*f* between the second height H2 and the third height H3 while the carriage body 10 travels can contribute to shortening the transport time of the article 9 as in the above configuration. The travel speed V while the support surface 21*f* is raised and lowered between the second height H2 and the third height H3 while the transport vehicle 1 travels, i.e., in the example shown in FIG. 9, the travel speed V while the transport vehicle 1 travels from the point B to the point C, is set to the reference speed Vs. However, even in this case, the travel speed V may be set lower than the reference speed Vs.

At the point C, the transport vehicle 1 maintains the height of the support surface 21*f* at the third height H3. The travel speed V of the carriage body 10 at this time is set to the reference speed Vs (V=Vs). In this state, the transport vehicle 1 travels from the point C to the point D.

At the point D, the transport vehicle 1 maintains the height of the support surface 21*f* at the third height H3. The travel speed V of the carriage body 10 at this time is set to the reference speed Vs (V=Vs). In this state, the transport vehicle 1 travels from the point D to the point E.

The point E is the directional change position 80 at which the transport vehicle 1 is to perform the relative turning operation that does not involve a change of the orientation of the article 9. At the point E, the support surface 21*f* needs to be positioned at the second height H2. The transport vehicle 1 changes the height of the support surface 21*f* from the third height H3 to the second height H2 while traveling from the point D to the point E. It is relatively easy to stabilize the orientation of the article 9 while changing the height of the support surface 21*f* between the second height H2 and the third height H3, as mentioned above. Thus, the transport vehicle 1 changes the height of the support surface 21*f* while traveling. Note that the travel speed V of the carriage body 10 at this time is set to the reference speed Vs (V=Vs).

At the point E, the transport vehicle 1 maintains the height of the support surface 21*f* at the second height H2. The travel speed V of the carriage body 10 at this time is set lower than the reference speed Vs (V<Vs). The travel speed V at the point E is set to zero in this example. The transport vehicle 1, while stopped, performs the relative turning operation at the point E, which is the directional change position 80. The transport vehicle 1 thus directs the travel direction of the carriage body 10 to the transport destination Pa without changing the orientation of the article 9 in a plan view. Thereafter, the transport vehicle 1 starts traveling from the point E to the transport destination Pa.

The transport vehicle 1 changes the height of the support surface 21*f* from the second height H2 to the first height H1 while traveling from the point E to the transport destination Pa. The travel speed V of the carriage body 10 at this time is set lower than the reference speed Vs (V<Vs).

At the transport destination Pa, the transport vehicle 1 delivers the article 9 to the transfer point 7 of the transport destination Pa by changing the height of the support surface 21*f* from the first height H1 to the third height H3. The travel speed V of the carriage body 10 at the transport destination Pa is set lower than the reference speed Vs (V<Vs). In this example, the travel speed V of the transport vehicle 1 while delivering the article 9 to the transfer point 7 of the transport destination Pa is set to zero. That is, the carriage body 10 is stopped.

The above-described transport facility 100 can shorten the transport time of the article 9.

Other Embodiments

Next, other embodiments of the transport facility are described.

Figure 11:
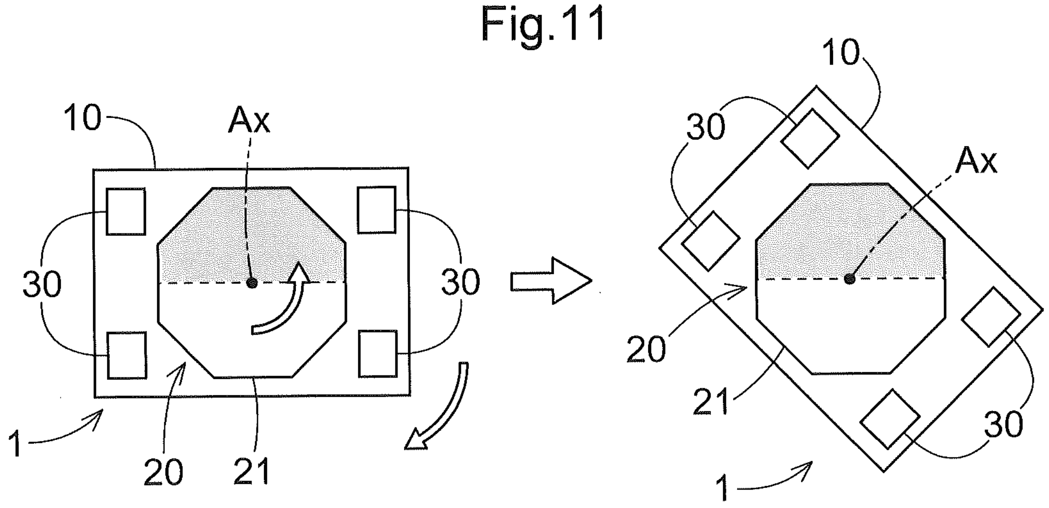
FIG. 11 is a plan view of a transport vehicle according to another embodiment.

(1) In the above embodiment, a description has been given of an example in which the support 21 has a regular N-sided polygonal shape (N is an integer greater than or equal to three) in a plan view, and the turner 23 turns the support 21 in 360/N degree increments relative to the carriage body 10. Further, as one example thereof, an example has been described in which the support 21 has a square shape (N=4) in a plan view, and the turner 23 turns the support 21 in 360/4 degree (90 degree) increments relative to the carriage body 10. However, there is no limitation to this example. For example, the support 21 may have a regular octagonal shape (N=8) in a plan view, and the turner 23 may turn the support 21 in 360/8 degree (45 degree) increments relative to the carriage body 10, as shown in FIG. 11. This allows the relationship in a plan view between the outer shape of the support 21 and the carriage body 10 to be the same even when the transport vehicle 1 performs a turning operation without the support 21 changing its orientation in a plan view. Although not shown in detail, the support 21 may alternatively have a perfect circle shape in a plan view, and the turner 23 may turn the support 21 at any angle relative to the carriage body 10. This can also exhibit the same effects as above. That is, the relationship in a plan view between the outer shape of the support 21 and the carriage body 10 can be made the same even when the transport vehicle 1 performs a turning operation without the support 21 changing its orientation in a plan view.

(2) In the above embodiment, a description has been given of an example in which the lift 22 raises and lowers the support surface 21*f* between the second height H2 and the third height H3 while the carriage body 10 travels. However, there is no limitation to this example. The lift 22 may alternatively raise and lower the support surface 21*f* between the second height H2 and the third height H3 while the carriage body 10 is stopped.

(3) In the above embodiment, a description has been given of an example in which the lift 22 can change the height of the support surface 21*f* between at least three levels, namely the first height H1, the second height H2, and the third height H3. The lift 22 may alternatively be capable of changing the height of the support surface 21*f* between four or more levels.

(4) In the above embodiment, a description has been given of an example in which each transfer point 7 includes a plurality of columns 72 spaced apart from each other at least in the vehicle width direction of the transport vehicle 1, and article receivers 720 at upper portions of the respective columns 72. However, there is no limitation to this example. Each transfer point 7 may alternatively include, for example, two placement plates that are spaced apart in the vehicle width direction.

(5) In the above embodiment, a description has been given of an example in which the transport route R is set so as to connect a plurality of detection target sections 8. However, there is no limitation to this example. For example, the transport route R may alternatively be set based on magnetic tape or the like that is provided continuously on the floor. Further, a configuration may also be possible in which the directional change position 80 is not determined based on the position of a detection target object (a detection target object for setting the transport route R, such as the detection target section 8 or magnetic tape) provided on the floor. For example, the transport vehicle 1 can be configured to recognize its own current position based on, for example, a detection signal from a GNSS (Global Navigation Satellite System) receiver, and perform a turning operation in response to the current position reaching the directional change position 80.

(6) Note that the configuration disclosed in the above embodiment can also be applied in combination with configurations disclosed in other embodiments as long as no contradiction arises. Regarding other configurations as well, the embodiment disclosed herein is merely an example in all respects. Accordingly, various modifications can be made as appropriate without departing from the gist of the present disclosure.

SUMMARY OF THE ABOVE EMBODIMENT

The summary of the above-described transport facility is described below.

A transport facility includes:
- a transfer point having a placement surface on which an article is placeable; and
- a transport vehicle including:
  - a transfer device configured to transfer the article to and from the transfer point; and
  - a carriage body configured to travel while supporting the transfer device,
- the transport vehicle is configured to travel along a floor and perform a turning operation to change a travel direction at a directional change position determined in accordance with a destination,
- the transfer device includes:
  - a support having a support surface configured to support the article from below,
  - a lift configured to raise and lower the support, and
  - a turner configured to turn the support relative to the carriage body about a turning axis extending along an up-down direction,
- the lift is capable of changing a height of the support surface to a first height higher than the placement surface, a second height lower than the placement surface, and a third height lower than the second height,
- the transfer device transfers the article to and from the transfer point by raising and lowering the support surface between the first height and the second height or the third height,
- the transport vehicle performs the turning operation with the support surface positioned at the second height in response to changing a direction of the carriage body without changing an orientation in a plan view of the article supported by the support surface by causing the turner to turn the support relative to the carriage body, and
- the transport vehicle travels with the support surface positioned at the second height if a straight distance from a travel starting point at which the transport vehicle starts traveling while supporting the article to the directional change position at which the transport vehicle is to perform the turning operation that does not involve a change of the orientation of the article is within a predetermined distance, and the transport vehicle travels with the support surface positioned at the third height if the straight distance is longer than the predetermined distance.

According to this configuration, the travel speed of the transport vehicle is unlikely to be high if the straight distance is within the predetermined distance. Thus, even if the article supported by the support surface is maintained at a relatively high position by positioning the support surface at the second height, the carriage body can travel without making the orientation of the article unstable. Further, the transport vehicle can reach the directional change position where the transport vehicle is to perform the turning operation while maintaining the height of the support surface at the second height. Thus, the transport vehicle can transition to the turning operation at this directional change position without changing the height of the support surface. Accordingly, the transport time of the article can be shortened. Furthermore, according to this configuration, the center of gravity of the transport vehicle can be lowered by positioning the support surface to the third height if the straight distance is longer than the predetermined distance. The transport vehicle can therefore travel at high speed while stabilizing the orientation of the article. Accordingly, the transport time of the article can also be shortened from this point.

It is preferable that the carriage body is capable of traveling at a predetermined reference speed, and
- the carriage body travels at a speed lower than the reference speed or stops while the lift raises and lowers the support surface between the first height and the second height or the third height.

While the support surface is positioned at the first height, the position of the article supported by the support surface is higher than while the support surface is positioned at the second or third height, making the orientation of the article less stable accordingly. According to this configuration, if the height of the support surface is changed, and this change includes a state where the height of the support surface is the first height, the carriage body travels at a speed lower than the reference speed, or stops. Therefore, it is possible to change the height of the support surface with high reliability in cases including a state where the height of the support surface is the first height.

It is preferable that the lift raises and lowers the support surface between the second height and the third height while the carriage body travels.

Compared to performing a change of the height of the support surface that includes a state where the height of the support surface is the first height, the orientation of the article can easily be stabilized in the case of performing a change of the height of the support surface between the second height and the third height that does not include a state where the height of the support surface is the first height. According to this configuration, in such a case, the travel of the carriage body and the change of the height of the support surface can be performed at the same time by changing the height of the support surface while the carriage body travels. This makes it easy to shorten the transport time.

It is preferable that the transport vehicle includes auxiliary supports configured to assist the support in supporting the article,
- the auxiliary supports are separated from each other with the support therebetween in a plan view,
- the auxiliary supports each have an auxiliary support surface whose height is fixed, and
- the third height is the same as or lower than the height of the auxiliary support surface.

According to this configuration, the article can be supported using the auxiliary support surface with the support surface positioned at the third height, thereby supporting the article more stably.

It is preferable that the transport vehicle performs the turning operation with the support surface positioned at the third height in response to changing the orientation in a plan view of the article supported by the support surface in conjunction with the turning operation.

According to this configuration, the orientation in a plan view of the article can be changed together with the orientation of the carriage body due to the transport vehicle performing the turning operation while supporting the article using the auxiliary support surface by positioning the support surface at the third height. With this, the orientation in a plan view of the article can be changed to an orientation suitable for the transfer point by the turning operation of the transport vehicle.

It is preferable that the transport facility further includes a control device, and the control device sets a transport route from a transport source to a transport destination of the article, and determines based on the transport route whether the straight distance is within the predetermined distance.

According to this configuration, the control device can more appropriately determine whether the straight distance is within the predetermined distance.

It is preferable that the transport vehicle includes a detector, the transport facility further includes detection target sections that are detectable by the detector and located at a plurality of locations on the floor, the transport route is set in such a manner as to connect a plurality of the detection target sections, and the directional change position is determined based on positions of the plurality of detection target sections.

According to this configuration, a relatively simple configuration allows the traveling position of the transport vehicle to be controlled with high accuracy. Further, it is easy to flexibly change the transport route and the directional change position of the transport vehicle in accordance with, for example, the management situation of the facility.

It is preferable that the support has a regular N-sided polygonal shape (N is an integer greater than or equal to three) in a plan view, and the turner turns the support in 360/N degree increments relative to the carriage body.

According to this configuration, even if the transport vehicle performs the turning operation without the support changing its orientation in a plan view, the relationship in a plan view between the outer shape of the support and the carriage body can be made the same. Therefore, the structure of the support and the carriage body can easily be simplified.

It is preferable that the transfer point includes:

a plurality of columns spaced apart from each other at least in a vehicle width direction of the transport vehicle; and article receivers located at upper portions of the columns, the plurality of article receivers each have the placement surface, and the transport vehicle transfers the article to and from the transfer point by raising and lowering the support surface between the first height and the second height or the third height, with the support positioned between the plurality of article receivers in a plan view.

According to this configuration, it is possible to easily realize a configuration in which the article can be transferred to and from the transfer point by raising and lowering the support surface.

It is preferable that the plurality of article receivers each have a regulator protruding upward from the placement surface and configured to regulate a position in a horizontal direction of the article placed on the placement surface, and the first height is set to a position higher than an upper end of the regulator.

According to this configuration, the regulator can regulate the position in the horizontal direction of the article placed at the transfer point. Further, it is possible to prevent the support and the regulator from interfering with each other even while the transport vehicle moves in and out of the transfer point with the support surface positioned at the first height.

INDUSTRIAL APPLICABILITY

The technology according to the present disclosure can be applied to a transport facility that includes a transfer point having a placement surface on which an article is placed, and a transport vehicle including a transfer device configured to transfer the article to and from the transfer point and a carriage body configured to travel while supporting the transfer device.

DESCRIPTION OF REFERENCE SIGNS

100: transport facility
1: transport vehicle
10: carriage body
20 transfer device
21: support
21*f*: support surface
22 lift
23: turner
30 auxiliary support
30*f*: auxiliary support surface
40: detector
7: transfer point
7*f*: placement surface
72: column
720: article receiver
721: regulator
8: detection target section
80: directional change position
9: article
Ax: turning axis
C: control device
Pa: transport destination
Pd: transport source
R: transport route
L: straight distance
Ls: predetermined distance
H1: first height
H2: second height
H3: third height
Vs: reference speed

The invention claimed is:

1. A transport facility comprising:

a transfer point having a placement surface on which an article is placeable; and a transport vehicle comprising:

a transfer device configured to transfer the article to and from the transfer point; and a carriage body configured to travel while supporting the transfer device, and wherein:

the transport vehicle is configured to travel along a floor and perform a turning operation to change a travel direction at a directional change position determined in accordance with a destination, the transfer device comprises:

a support having a support surface configured to support the article from below, a lift configured to raise and lower the support, and a turner configured to turn the support relative to the carriage body about a turning axis extending along an up-down direction, the lift is capable of changing a height of the support surface to a third height lower than the placement surface and a height higher than the third height, a control device configured to perform the turning operation of the transport vehicle, wherein the support surface positioned at the height higher than the third height in response to changing a direction of the carriage body without changing an orientation in a plan view of the article supported by the support surface by causing the turner to turn the support relative to the carriage body, and the transport vehicle travels with the support surface positioned at the height higher than the third height if a straight distance from a travel starting point at which the transport vehicle starts traveling while supporting the article to the directional change position at which the transport vehicle is to perform the turning operation that does not involve a change of the orientation of the article is within a predetermined distance, and the transport vehicle travels with the support surface positioned at the third height if the straight distance is longer than the predetermined distance.

2. The transport facility according to claim 1, wherein the height higher than the third height includes a first height higher than the placement surface and a second height lower than the placement surface and higher than the third height, the carriage body is capable of traveling at a predetermined reference speed, and wherein the carriage body travels at a speed lower than the reference speed or stops while the lift raises and lowers the support surface between the first height and the second height or the third height.

3. The transport facility according to claim 2, wherein the lift raises and lowers the support surface between the second height and the third height while the carriage body travels.

4. The transport facility according to claim 1, wherein:

the transport vehicle comprises auxiliary supports configured to assist the support in supporting the article, the auxiliary supports are separated from each other with the support therebetween in a plan view, the auxiliary supports each have an auxiliary support surface whose height is fixed, and the third height is the same as or lower than the height of the auxiliary support surface.

5. The transport facility according to claim 4, wherein the transport vehicle performs the turning operation with the support surface positioned at the third height in response to changing the orientation in a plan view of the article supported by the support surface in conjunction with the turning operation.

6. The transport facility according to claim 1, further comprising:

the control device, and wherein the control device sets a transport route from a transport source to a transport destination of the article, and determines based on the transport route whether the straight distance is within the predetermined distance.

7. The transport facility according to claim 6, wherein:

the transport vehicle comprises a detector, the transport facility further comprises detection target sections that are detectable by the detector and located at a plurality of locations on the floor, the transport route is set in such a manner as to connect a plurality of the detection target sections, and the directional change position is determined based on positions of the plurality of detection target sections.

8. The transport facility according to claim 1, wherein the support has a regular N-sided polygonal shape (N is an integer greater than or equal to three) in a plan view, and wherein the turner turns the support in 360/N degree increments relative to the carriage body.

9. The transport facility according to claim 1, wherein the height higher than the third height includes a first height higher than the placement surface and a second height lower than the placement surface and higher than the third height, the transfer point comprises:

a plurality of columns spaced apart from each other at least in a vehicle width direction of the transport vehicle; and article receivers located at upper portions of the columns, wherein the plurality of article receivers each have the placement surface, and wherein the transport vehicle transfers the article to and from the transfer point by raising and lowering the support surface between the first height and the second height or the third height, with the support positioned between the plurality of article receivers in a plan view.

10. The transport facility according to claim 9, wherein the plurality of article receivers each have a regulator protruding upward from the placement surface and configured to regulate a position in a horizontal direction of the article placed on the placement surface, and wherein the first height is set to a position higher than an upper end of the regulator.

11. The transport facility according to claim 1, wherein the support has a circle shape in a plan view, and the turner turns the support at any angle relative to the carriage body.

* * * * *